R. LUNDELL.
INTERPOLE FIELD MAGNET.
APPLICATION FILED FEB. 7, 1910.
1,045,159. Patented Nov. 26, 1912.
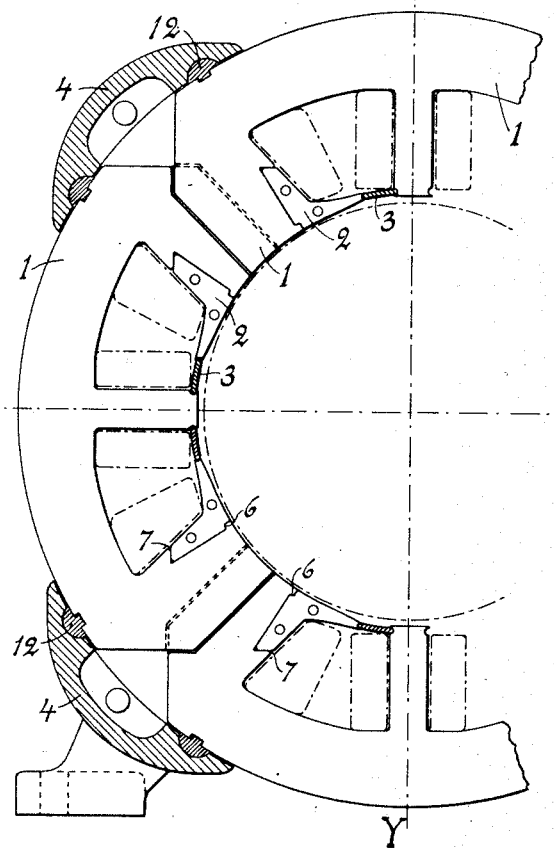
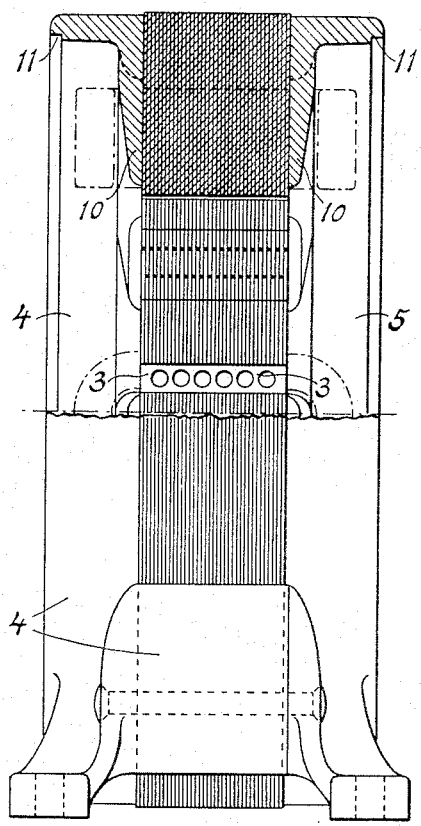
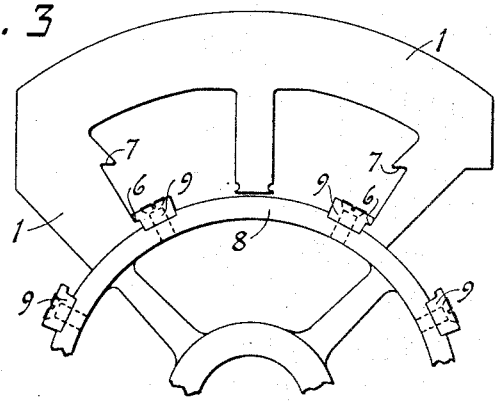
Witnesses:
M. F. Keating
Edward Rowland
Inventor
Robert Lundell
By Attorney
Charles J. Kintner

UNITED STATES PATENT OFFICE.

ROBERT LUNDELL, OF NEW YORK, N. Y.

INTERPOLE FIELD-MAGNET.

1,045,159.  Specification of Letters Patent.  Patented Nov. 26, 1912.

Application filed February 7, 1910. Serial No. 542,615.

*To all whom it may concern:*

Be it known that I, ROBERT LUNDELL, a citizen of the United States, and resident of New York, borough of Manhattan, county and State of New York, have made a new and useful Invention in Interpole Field-Magnets, of which the following is a specification.

The present invention relates to improvements in field magnets for electric motors and dynamos and it relates in particular to the construction of those field magnets which are furnished with commutating poles, usually called interpoles.

The invention has for its objects, first, to improve the distribution of the field flux when the machine is working under full load or over-load. That is to say, the object is to cause the interpoles to serve not only as commutating poles, but also, to some extent, as compensating poles, particularly in connection with strong armature reactions and comparatively weak field strengths. Second, to overcome the humming noise due to the abrupt changes in the magnetization of the teeth in a slotted armature as the said teeth are passing highly saturated pole corners—which noise is more or less difficult to avoid in machines of ordinary construction. Third, to devise an improved laminated field construction of the interpole type, which avoids the use of bolts or similar means for securing the various poles or pole-faces in their respective positions.

I prefer to accomplish the aforesaid objects in connection with a laminated field magnet in which the laminations are held together "*en masse*" in a rigid skeleton frame or crate, substantially as shown in my U. S. Patents Nos. 695,163 of March 11th, 1902, and 729,879 of June 2nd, 1903.

For a full and clear understanding of the invention, such as will enable others skilled in the art to construct the same, reference is made to the accompanying drawings, in which, Figure 1 is a part sectional, part end elevational view of the greater portion of a field magnet having four main poles and four interpoles. Fig. 2 is a vertical sectional view of the field magnet illustrated in Fig. 1 taken on the broken line X—Y and as seen looking thereat from right to left. Fig. 3 is a detail view and illustrates one of the separate main field punchings and a portion of a drum or mandrel which is used for the purpose of assembling said main field punchings.

Referring now to the drawings in detail, 1 represents a main sheet iron (or sheet steel) punching for the laminated field structure. Four of these punchings complete one layer of a field structure having four main poles and four interpoles. The punchings are turned over for every other layer in order to cause the joints to overlap in the center of the main poles, as clearly shown in Fig. 1. 2 represents another field punching which serves the purpose of completing the main poles by adding suitable polar extensions to said main poles. These smaller punchings are assembled on top of one another to the full depth or thickness of the laminated structure and are riveted together in a manner well known in connection with the construction of laminated pole-faces. The end plates, between which the small punchings are riveted, may conveniently be obtained by punching heavier material to serve as end plates or by soldering together several of the thin punchings.

3 indicates one of a series of flat strips or wedges which extend across the entire width of the laminated structure. These strips are preferably made of magnetic material (iron) for the purpose of magnetically bridging the space between the main pole tips and the ends of the interpoles. Said strips are preferably perforated for the purpose of increasing their magnetic reluctance and for improving the ventilation. These strips are driven endwise into small grooves in the ends of the main polar extensions and in the lower edges of the interpoles, substantially in the same manner that "armature wedges" for slotted armatures are driven into similar grooves in the armature teeth.

4 and 5 indicate cast field frames or brackets designed to rigidly support the laminated structure. One of these frames 4 (see Fig. 2) is furnished with several extensions in the direction of the axis of the machine (four extensions in a four-pole structure) which extensions serve as rigid connecting pieces between the two frames. Said frames are also furnished with other extensions projecting radially toward the center of the machine (see 10 Fig. 2) which serve as end plates for the various poles.

The different parts of the field magnet are put together as follows:

(1) A sufficient number of the large field punchings 1 are assembled on the mandrel 8 of Fig. 3, which mandrel is furnished with suitable keys 9 for clamping or catching the small projections 6 on the main poles. This mandrel with its keys will insure an accurate airgap and a perfect alinement of the laminations between the projections 6 and the catches 7.

(2) The cast field frames 4 and 5 are bolted or riveted together over the main field punchings as indicated in Fig. 2, thereby causing said punchings to become firmly held under pressure in a rigid skeleton frame or crate, as shown in Figs. 1 and 2.

(3) Type metal or other suitable material is cast into the grooves 12 (see Fig. 1) through suitable holes in either one of the frames 4 or 5. This operation locks the parts together and serves to compensate for any irregularity in the punchings at their outer edges.

(4) The seats 11 (see Fig. 2) for the bearing brackets are turned out in a lathe, perfect centering being obtained by means of the mandrel 8 which still remains in the field structure.

(5) The mandrel 8 is forced out in a suitable press.

(6) The various field coils (indicated by the broken lines) are assembled on their respective poles.

(7) The polar extensions which have been built up from the small punchings 2 are now forced into their respective places and are finally locked by the wedges 3.

It will be understood that the above-mentioned process of construction insures accuracy of the airgap relative to the bearing supports, and absolute reliability of the magnetic circuits.

Referring now to the function of the wedges 3 between the main pole tips and the ends of the interpoles, it should first be pointed out that a strong armature reaction in combination with a comparatively weak field (for instance, such as employed in connection with the high speeds of a variable speed motor) will tend to super-saturate one of the pole tips and annul or even reverse the polarity of the opposite pole tip. Super-saturated pole tips produce a humming noise, and a reversal of the polarity in opposite pole tips causes the operation of a motor to become exceedingly unstable. The polarities of the interpoles are such that they tend to neutralize the above-mentioned evil effects of the armature reaction—provided the construction is such that the lines of force from the interpoles are properly conducted to the said pole tips.

The purpose of the described construction is to provide means by which the lines of force from the interpoles may be magnetically conducted to the main pole tips. This is most conveniently accomplished by making the wedges 3 of magnetic material. The "leakage" of lines of force between the interpoles and the main pole tips can with this construction be adjusted to suit specific requirements. That is to say, if only a small leakage is desired the magnetic wedges or strips 3 may be provided with holes or slots as shown in Fig. 2, thereby increasing the magnetic reluctance of the said wedges.

Having thus described my invention what I claim and desire to secure by Letters Patent of the United States is—

1. A field magnet of the interpole type having high reluctance magnetic bridge-pieces between the two pole-tips or pole corners of a main pole and the adjacent interpoles, said bridge-pieces extending from the extreme polar edges practically in continuation of the pole surface, substantially as and for the purpose described.

2. A field magnet provided with main poles and interpoles; in combination with high reluctance magnetic means for connecting the two polar extensions of a main pole to the adjacent pole corners of the interpoles, so that practically a continuous pole surface is obtained, substantially as described.

3. A field magnet provided with main poles and interpoles, in combination with perforated connecting pieces of magnetic material for connecting the two pole-tips or pole corners of a main pole to the adjacent pole corners of the interpoles, substantially as and for the purpose described.

In testimony whereof I have signed my name to this specification in the presence of two subscribing witnesses.

ROBERT LUNDELL.

Witnesses:
C. J. KINTNER,
M. F. KEATING.